United States Patent
Frommer et al.

(10) Patent No.: US 7,380,062 B2
(45) Date of Patent: May 27, 2008

(54) MECHANISM IN A MULTI-THREADED MICROPROCESSOR TO MAINTAIN BEST CASE DEMAND INSTRUCTION REDISPATCH

(75) Inventors: Scott Bruce Frommer, Cold Spring, NY (US); Sheldon B. Levenstein, Austin, TX (US); Bruce Joseph Ronchetti, Austin, TX (US); Anthony Saporito, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 11/055,818

(22) Filed: Feb. 11, 2005

(65) Prior Publication Data
US 2006/0184739 A1 Aug. 17, 2006

(51) Int. Cl.
*G06F 12/02* (2006.01)
(52) U.S. Cl. .................. 711/118; 711/167; 711/168; 711/213
(58) Field of Classification Search ............... 711/118, 711/167
See application file for complete search history.

(56) References Cited

U.S. PATENT DOCUMENTS 6,088,788 A * 7/2000 Borkenhagen et al. ...... 712/205
6,754,808 B1 6/2004 Roth et al.
2006/0179264 A1 * 8/2006 Hinojosa et al. ............ 711/202

OTHER PUBLICATIONS

Dooley et al., Auxiliary Mechanism to Manage Instruction Restart and Restart Coming in a Lookahead Processor.
Dooley et al., Lookahead Mode Sequencer.
Tullsen et al., "Simultaneous Multithreading: Maximizing On-Chip Parallelism", pp. 533-544, 1995, ACM, WA.
Llena, "Recovery Mechanisms for Latency Mispredictions", Address Predications and Recovery Mechanisms, May 2002, pp. 149-178, Barcelona, SPain.

* cited by examiner

*Primary Examiner*—Than Nguyen
(74) *Attorney, Agent, or Firm*—Duke W. Yee; Mark E. McBurney; Cathrine K. Kinslow

(57) ABSTRACT

A method and system for maintaining a best-case demand redispatch of an instruction to allow for maximizing the time a rejected thread may execute in lookahead execution mode, while maintaining the smallest L1 cache miss penalty supported by the memory subsystem. In response to a demand miss, a load/store unit sends a fetch request to the next level cache. The cache line of the demand miss is examined to identify the critical sector. Once the critical sector is identified, a best-case data return time is determined based on the fastest time the next level cache is able to return the critical sector of the cache line. The load/store unit then sends a speculative warning to the dispatch unit to coincide with the best-case data return, wherein the speculative warning prepares the dispatch unit to resend the instruction for execution as soon as data is available to the processor core.

9 Claims, 4 Drawing Sheets

BCRT = (B)EST (C)ASE (R)ETURN (T)IMING

MECHANISM IN A MULTI-THREADED MICROPROCESSOR TO MAINTAIN BEST CASE DEMAND INSTRUCTION REDISPATCH

CROSS REFERENCE TO RELATED APPLICATIONS

This application is related to commonly assigned and co-pending U.S. patent application Ser. No. 11/055,844 entitled "Auxiliary Mechanism to Manage Instruction Restart and Restart Coming in a Lookahead Processor"; and commonly assigned co-pending and U.S. patent application Ser. No. 11/055,862 entitled "Lookahead Mode Sequencer"; both applications filed even date hereof, and incorporated herein by reference.

BACKGROUND OF THE INVENTION

1. Technical Field

The present invention relates to an improved data processing system, and in particular, the present invention is directed to a system and method in a multi-threaded processor for maintaining a best-case demand redispatch of an instruction.

2. Description of Related Art

Microprocessor chips generally comprises various hardware elements including processing cores and cache memory. A processing core may include multiple sub-elements such as one or more floating point units, load/store units, instruction sequencing units, fixed point execution units, instruction fetch units, instruction dispatch units, branch execution units, and possibly other sub-elements. The terms "processing core" and "processor" are used interchangeably herein to refer to the same device.

A technique used in advanced microprocessors where the microprocessor begins executing a second instruction before the first has been completed is called pipelining. That is, several instructions are in the pipeline simultaneously, each at a different processing stage. The pipeline is divided into segments and each segment can execute its operation concurrently with the other segments. When a segment completes an operation, it passes the result to the next segment in the pipeline and fetches the next operation from the preceding segment. The final results of each instruction emerge at the end of the pipeline in rapid succession. This arrangement allows all the segments to work in parallel thus giving greater throughput than if each input had to pass through the whole pipeline before the next input could enter. The costs are greater latency and complexity due to the need to synchronize the segments in some way so that different inputs do not interfere. The pipeline will only work at full efficiency if it can be filled and emptied at the same rate that it can process.

Cache memory, which is typically comprised of high-speed static RAM (SRAM) devices, is used for holding instructions and/or data that are likely to be accessed in the near term by the processor. Because processors have increased in operating speed at a much faster pace than RAM as technology has progressed, without adequate system design, a processor could waste much of its time waiting to obtain instructions or data from memory, rather than performing calculations. One of the fastest types of RAM, Static RAM (SRAM), is generally too expensive to use for all of system's memory needs. As a compromise, computers generally come with a relatively small amount of SRAM that is used as cache memory. If an instruction or data stored in cache is required again, the computer can access the cache for the instruction/data rather than having to access the relatively slower DRAM. Since the cache memory is organized more efficiently, the time to find and retrieve information is reduced and the CPU is not left waiting for more information.

Many processors have two types of cache memory: level 1 and level 2. Level 1 (L1) cache has a very fast access time, and is typically embedded as part of the processor device itself. Level 2 (L2) is typically situated near, but separate from, the processor and has an interconnecting bus to the processor. Modern processors may also have both L1 and L2 caches integrated into their core or chip. Some systems also have a separate instruction cache and data cache.

Lookahead execution is another technique for improving the overall performance of a data processing system. Lookahead execution offers a solution to the performance problem from long stalls due to cache misses and translation misses. Load/store performance in an in-order machine can be improved by speculatively continuing to execute instructions in a "lookahead mode" during stalled periods in order to generate addresses that will be needed in the L1 cache and translation mechanism. This assures that needed data is available when the stall period ends and normal dispatch resumes, avoiding additional stalls. Lookahead Mode functions somewhat like a very exact prefetch mechanism which allows the load/store unit to make use of processor cycles that would otherwise go unused. For example, if a demand instruction misses the L1 cache, rather than stall the pipeline and wait for the data to return, the processor core will place a mark at the rejected instruction and then continue executing the instruction stream beyond that point while waiting for the data to return for the demand instruction. While this lookahead execution takes place, the caches and prediction arrays may be updated, but the architected facilities cannot. Lookahead execution may thus greatly reduce future penalties resulting from L1 misses and surprise branches.

The L2 cache may also improve performance by sending a speculative data-coming indication to the processor core several cycles before the data for a fetch request is actually available to the core. Existing systems use this data-coming indication to allow the processor core to prepare itself to use the data without further delay of the stalled instruction that caused the fetch and cannot complete until the data is available. However, a problem encountered when the lookahead execution feature is employed is that when a restart is generated from the L2 cache's data-coming warning, the instruction dispatch unit cannot deliver the stalled instruction back to the load/store unit (LSU) quickly enough to use the fetch data as soon as it is available to the processor core. Failure to deliver the stalled instruction quickly enough would result in a performance degrading cycle gap between when fetch data is available in the core, and when the demand instruction actually uses that data. This degradation would be a direct result of implementing the performance increasing lookahead feature.

Therefore, it would be advantageous to have a method and system for maintaining a best-case demand redispatch of an instruction to allow for maximizing the time a rejected thread may execute in lookahead execution mode while maintaining the smallest L1 miss penalty supported by the cache hierarchy design.

SUMMARY OF THE INVENTION

The present invention provides a method and system for maintaining a best-case demand redispatch of an instruction to allow for maximizing the time a rejected thread may execute in lookahead execution mode, while maintaining the smallest L1 cache miss penalty supported by the memory subsystem. In response to demand miss, a load/store unit sends a fetch request to a next level cache in a memory hierarchy. The cache line of the demand miss is examined to identify the critical sector of the cache line. Once the critical sector is identified, a best-case data return is generated by determining the fastest time the next level cache is able to return the critical sector of the cache line. The load/store unit then sends a speculative warning to the dispatch unit to coincide with the best-case data return, wherein the speculative warning prepares the dispatch unit to resend the instruction for execution as soon as data is available to the processor core.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
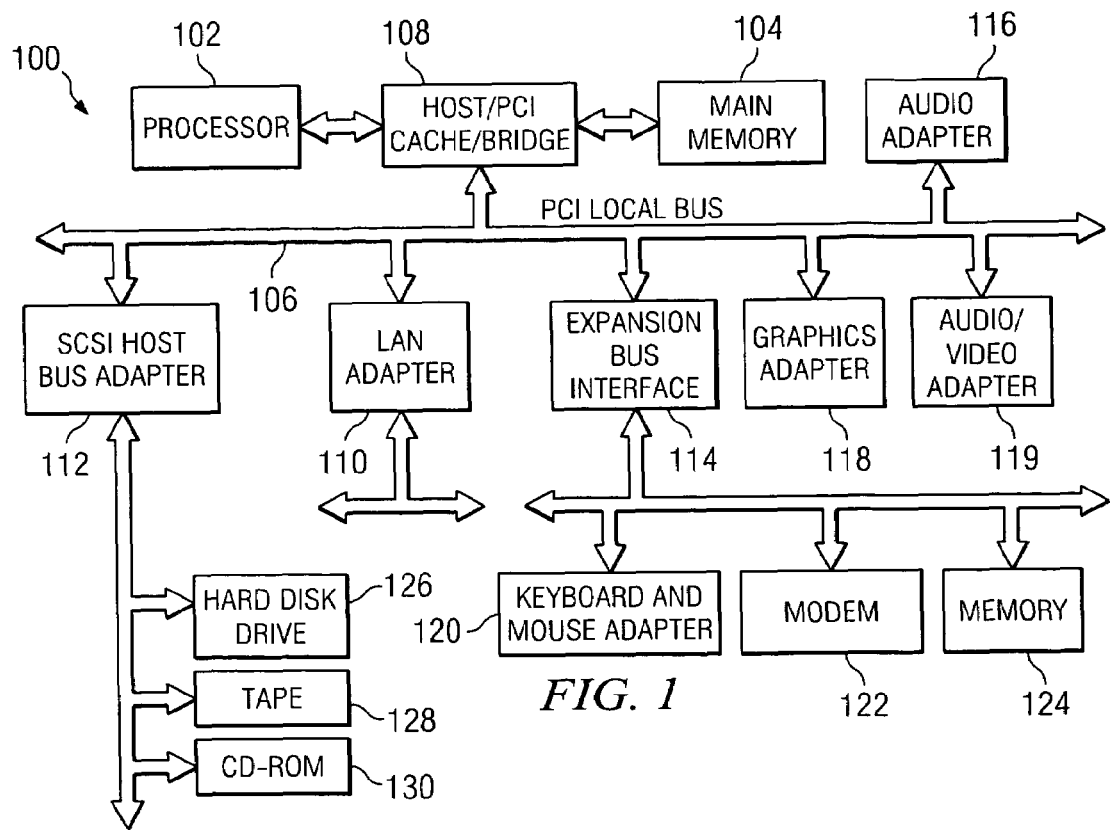
FIG. 1 is a pictorial representation of a data processing system in which the present invention may be implemented.

With reference now to FIG. 1, an exemplary block diagram of a data processing system is shown in which the present invention may be implemented. Data processing system 100 is an example of a computer, in which code or instructions implementing the processes of the present invention may be located. Data processing system 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows XP, which is available from Microsoft Corporation. An object oriented programming system such as Java may run in conjunction with the operating system and provides calls to the operating system from Java programs or applications executing on client 100. "Java" is a trademark of Sun Microsystems, Inc. Instructions for the operating system, the object-oriented programming system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, data processing system 100, if optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, data processing system 100 may be a stand-alone system configured to be bootable without relying on some type of network communication interface, whether or not data processing system 100 comprises some type of network communication interface. As a further example, data processing system 100 may be a personal digital assistant (PDA), which is configured with ROM and/or flash ROM to provide non-volatile memory for storing operating system files and/or user-generated data. The depicted example in FIG. 1 and above-described examples are not meant to imply architectural limitations.

The processes of the present invention are performed by processor 102 using computer implemented instructions, which may be located in a memory such as, for example, main memory 104, memory 124, or in one or more peripheral devices 126-130.

Figure 2:
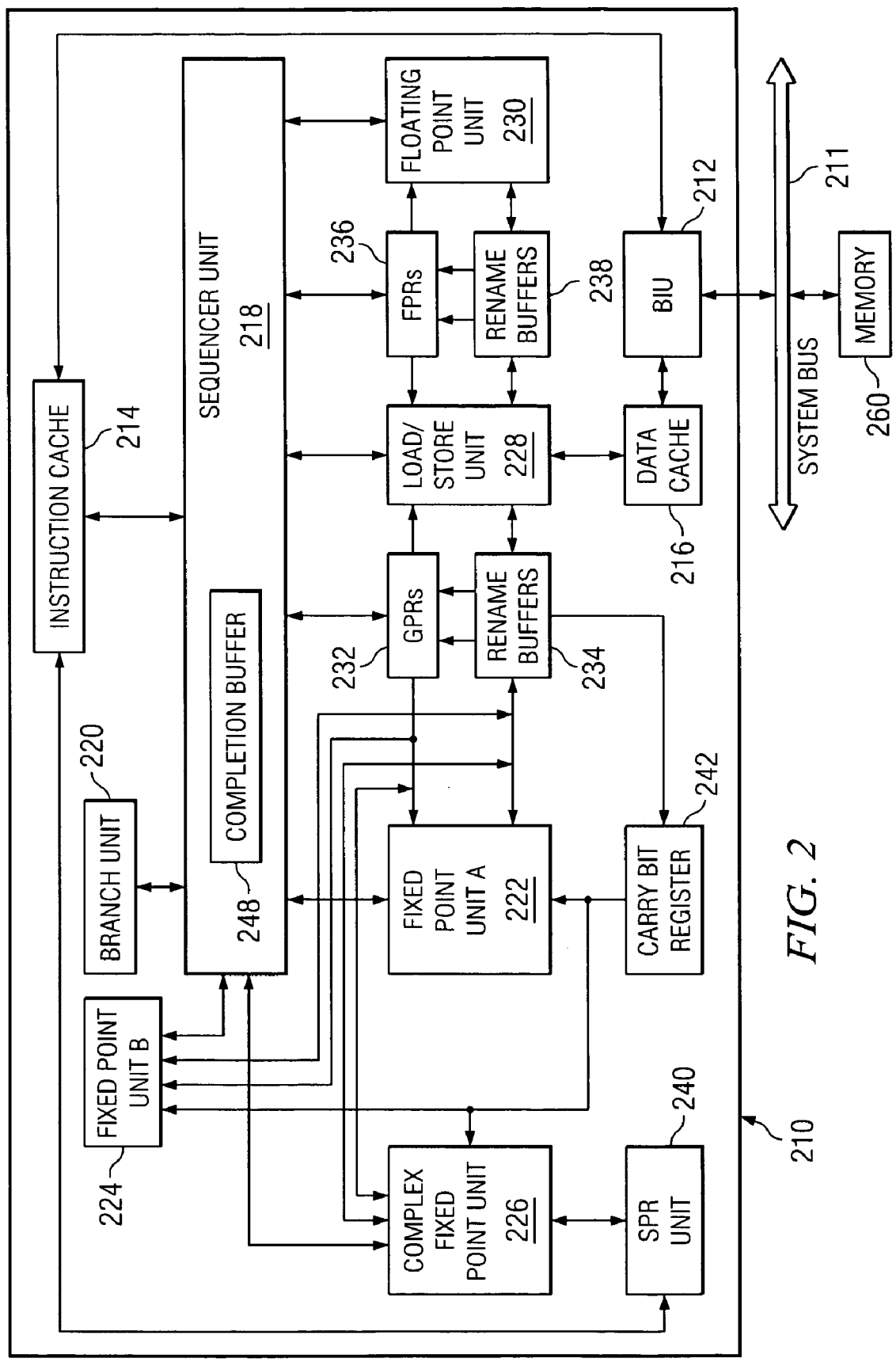
FIG. 2 is an exemplary block diagram of a data processing system in which aspects of the present invention may be implemented.

Turning next to FIG. 2, an exemplary block diagram of a processor system for processing information is depicted in accordance with a preferred embodiment of the present invention. Processor 210 may be implemented as processor 102 in FIG. 1.

In a preferred embodiment, processor 210 is a single integrated circuit superscalar microprocessor. Accordingly, as discussed further herein below, processor 210 includes various units, registers, buffers, memories, and other sections, all of which are formed by integrated circuitry. Also, in the preferred embodiment, processor 210 operates according to reduced instruction set computer (RISC) techniques. As shown in FIG. 2, system bus 211 is connected to a bus interface unit (BIU) 212 of processor 210. BIU 212 controls the transfer of information between processor 210 and system bus 211.

BIU 212 is connected to an instruction cache 214 and to data cache 216 of processor 210. Instruction cache 214 outputs instructions to sequencer unit 218. In response to such instructions from instruction cache 214, sequencer unit 218 selectively outputs instructions to other execution circuitry of processor 210.

In addition to sequencer unit 218, in the preferred embodiment, the execution circuitry of processor 210 includes multiple execution units, namely a branch unit 220, a fixed-point unit A (FXUA) 222, a fixed-point unit B (FXUB) 224, a complex fixed-point unit (CFXU) 226, a load/store unit (LSU) 228, and a floating-point unit (FPU) 230. FXUA 222, FXUB 224, CFXU 226, and LSU 228 input their source operand information from general-purpose architectural registers (GPRs) 232 and fixed-point rename buffers 234. Moreover, FXUA 222 and FXUB 224 input a "carry bit" from a carry bit (CA) register 239. FXUA 222, FXUB 224, CFXU 226, and LSU 228 output results (destination operand information) of their operations for storage at selected entries in fixed-point rename buffers 234. Also, CFXU 226 inputs and outputs source operand information and destination operand information to and from special-purpose register (SPR) processing unit 237.

FPU 230 inputs its source operand information from floating-point architectural registers (FPRs) 236 and floating-point rename buffers 238. FPU 230 outputs results (destination operand information) of its operation for storage at selected entries in floating-point rename buffers 238.

In response to a Load instruction, LSU 228 inputs information from data cache 216 and copies such information to selected ones of rename buffers 234 and 238. If such information is not stored in data cache 216, then data cache 216 inputs (through BIU 212 and system bus 211) such information from a system memory 260 connected to system bus 211. Moreover, data cache 216 is able to output (through BIU 212 and system bus 211) information from data cache 216 to system memory 260 connected to system bus 211. In response to a Store instruction, LSU 228 inputs information from a selected one of GPRs 232 and FPRs 236 and copies such information to data cache 216.

Sequencer unit 218 inputs and outputs information to and from GPRs 232 and FPRs 236. From sequencer unit 218, branch unit 220 inputs instructions and signals indicating a present state of processor 210. In response to such instructions and signals, branch unit 220 outputs (to sequencer unit 218) signals indicating suitable memory addresses storing a sequence of instructions for execution by processor 210. In response to such signals from branch unit 220, sequencer unit 218 inputs the indicated sequence of instructions from instruction cache 214. If one or more of the sequence of instructions is not stored in instruction cache 214, then instruction cache 214 inputs (through BIU 212 and system bus 211) such instructions from system memory 260 connected to system bus 211.

In response to the instructions input from instruction cache 214, sequencer unit 218 selectively dispatches the instructions to selected ones of execution units 220, 222, 224, 226, 228, and 230. Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

As information is stored at a selected one of rename buffers 234, such information is associated with a storage location (e.g., one of GPRs 232 or carry bit (CA) register 242) as specified by the instruction for which the selected rename buffer is allocated. Information stored at a selected one of rename buffers 234 is copied to its associated one of GPRs 232 (or CA register 242) in response to signals from sequencer unit 218. Sequencer unit 218 directs such copying of information stored at a selected one of rename buffers 234 in response to "completing" the instruction that generated the information. Such copying is called "writeback."

As information is stored at a selected one of rename buffers 238, such information is associated with one of FPRs 236. Information stored at a selected one of rename buffers 238 is copied to its associated one of FPRs 236 in response to signals from sequencer unit 218. Sequencer unit 218 directs such copying of information stored at a selected one of rename buffers 238 in response to "completing" the instruction that generated the information.

Processor 210 achieves high performance by processing multiple instructions simultaneously at various ones of execution units 220, 222, 224, 226, 228, and 230. Accordingly, each instruction is processed as a sequence of stages, each being executable in parallel with stages of other instructions. Such a technique is called "pipelining." In a significant aspect of the illustrative embodiment, an instruction is normally processed as six stages, namely fetch, decode, dispatch, execute, completion, and writeback.

In the fetch stage, sequencer unit 218 selectively inputs (from instruction cache 214) one or more instructions from one or more memory addresses storing the sequence of instructions discussed further hereinabove in connection with branch unit 220, and sequencer unit 218.

In the decode stage, sequencer unit 218 decodes up to four fetched instructions.

In the dispatch stage, sequencer unit 218 selectively dispatches up to four decoded instructions to selected (in response to the decoding in the decode stage) ones of execution units 220, 222, 224, 226, 228, and 230 after reserving rename buffer entries for the dispatched instructions' results (destination operand information). In the dispatch stage, operand information is supplied to the selected execution units for dispatched instructions. Processor 210 dispatches instructions in order of their programmed sequence.

In the execute stage, execution units execute their dispatched instructions and output results (destination operand information) of their operations for storage at selected entries in rename buffers 234 and rename buffers 238 as discussed further herein above. In this manner, processor 210 is able to execute instructions out-of-order relative to their programmed sequence.

In the completion stage, sequencer unit 218 indicates an instruction is "complete." Processor 210 "completes" instructions in order of their programmed sequence.

In the writeback stage, sequencer 218 directs the copying of information from rename buffers 234 and 238 to GPRs 232 and FPRs 236, respectively. Sequencer unit 218 directs such copying of information stored at a selected rename buffer. Likewise, in the writeback stage of a particular instruction, processor 210 updates its architectural states in response to the particular instruction. Processor 210 processes the respective "writeback" stages of instructions in order of their programmed sequence. Processor 210 advantageously merges an instruction's completion stage and writeback stage in specified situations.

In the illustrative embodiment, each instruction requires one machine cycle to complete each of the stages of instruction processing. Nevertheless, some instructions (e.g., complex fixed-point instructions executed by CFXU 226) may require more than one cycle. Accordingly, a variable delay may occur between a particular instruction's execution and completion stages in response to the variation in time required for completion of preceding instructions.

Completion buffer 248 is provided within sequencer 218 to track the completion of the multiple instructions that are being executed within the execution units. Upon an indication that an instruction or a group of instructions have been completed successfully, in an application specified sequential order, completion buffer 248 may be utilized to initiate the transfer of the results of those completed instructions to the associated general-purpose registers.

As previously mentioned, the present invention provides a mechanism for maintaining a best-case demand redispatch of an instruction. The mechanism of the present invention also allows for maximizing the time a rejected thread may execute in lookahead execution mode. When the dispatch unit sends an instruction to the load/store unit for execution, if the load/store unit cannot handle the demand due to a resource conflict, the load/store unit sends a reject to the dispatch unit. If a demand miss (or a cache miss if lookahead execution mode is not used) is the cause of the reject, the load/store unit sends a fetch to the L2 cache. When the data is returned to the processor core, the load/store unit informs the dispatch unit that the requested data is coming. In response to the L2 cache sending the data-coming warning, a restart is performed, wherein the restart causes the dispatch unit resend the instruction to use the requested data.

With the mechanism of the present invention, the load/store unit (LSU) maintains the best case L1 miss penalty in many cases by speculatively forcing the dispatch unit to prepare itself for the restart that is expected due to a data_coming indication. The speculative warning from the LSU is referred to as a 'restart_coming'. A restart_coming warning allows the dispatch unit to resend the pending demand instruction quickly enough to the LSU so that LSU may use the data and execute the instruction as soon as the data is available to the core. The LSU waits to send the restart_coming until the last possible moment, wherein the last possible moment for sending the restart_coming warning is based on a determination of the fastest calculated return time for the critical data section of the requested cache line. By holding the restart_coming based on the best case redispatch of an instruction, the dispatch unit is allowed to continue to issue instructions in lookahead mode. In this manner, the processor core may maximize its instruction stream prefetch to further reduce the L1 miss penalty of future demand loads.

The mechanism of the present invention identifies the subsection of the cache line that a demand miss needs available before it can make progress. Once the critical sector is determined, the mechanism of the present invention determines the quickest possible time or best-case data return that the L2 cache can return that portion of the cache line. The LSU sends a restart_coming to coincide with the best-case data return. By sending the restart_coming with the best-case data return, the time that the rejected thread can execute in lookahead mode may be increased.

As a restart is sent to the dispatch unit is based on the actual data_coming indication, if the data_coming indication proves to be true, the job is completed. However, if the data_coming indication is false, the LSU sends another restart_coming signal to allow the dispatch unit to prepare for the next data_coming indicator.

It should be noted that in certain processor implementations, there may also be strict requirements for the restart_coming and restart signals. In this specific case, when sending restart and restart_coming signals, certain spacing rules must be followed regardless of the L2 interface behavior. For example, if a restart signal was previously sent to the dispatch unit and a restart_coming signal is to be sent, there should be at least four dead cycles between the restart and restart_coming signals. If a restart_coming signal was previously sent to the dispatch unit, and another restart_coming signal is to be sent, there should be at least seven dead cycles between the restart_coming and the second restart_coming signals. If a restart_coming was previously sent to the dispatch unit and a restart signal is to be sent, there should be at least two dead cycles between the restart_coming and restart signals. As a restart will never follow another restart (no matter how far apart), there will always be a restart_coming placed in between restart signals.

Figure 3:
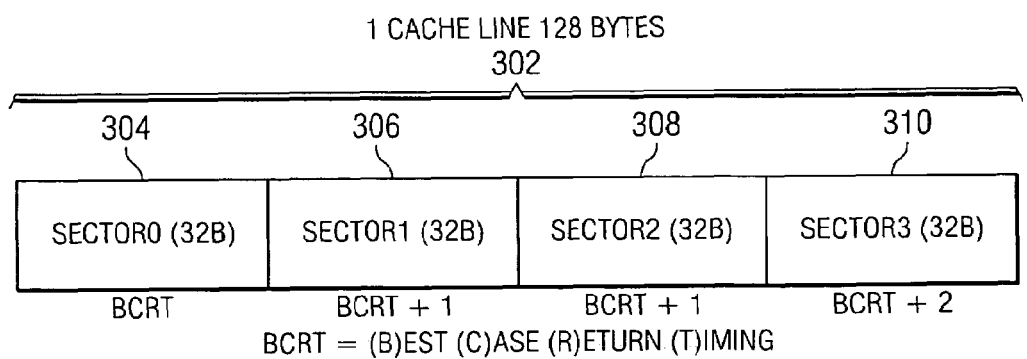
FIG. 3 is an exemplary diagram depicting subsections of a cache line for a demand miss in accordance with a preferred embodiment of the present invention.

As mentioned above, the mechanism of the present invention uses the LSU to first identify the critical subsection of the cache line (i.e., the subsection of the cache line that a demand miss needs available before it can make progress). FIG. 3 is an exemplary diagram depicting subsections of a cache line for a demand miss in accordance with a preferred embodiment of the present invention. The critical sector of a cache line is the quarter of the line containing the data that will be used by the demand load that fetched the line.

In particular, FIG. 3 illustrates the timing relationship for sectors in the cache line. In this illustrative example, cache line 302 comprises 128 bytes and four sectors, sector0 304, sector1 306, sector2 308, and sector3 310. Each sector 304-310 comprises 32 bytes. The critical sector in this particular example is sector0 304. Sector0 304 is the quarter of the cache line that contains the data needed for the load to make progress. Thus, when the LSU sends the initial restart_coming, this restart_coming is based on the critical sector, or sector0 304 of the demand load. Each sector in the cache line will have different best-case reload times, such that the best-case reload time for sector0 304 will differ from the best_case reload times for sector1 306, etc.

Once the critical sector is determined by the LSU, the mechanism of the present invention determines the quickest possible time or best-case data return that the L2 cache can return that portion of the cache line. In other words, the LSU determines the fastest time the cache can send back the sector to the LSU, and thus the maximum amount of time the LSU may wait before sending the restart_coming to the dispatch unit.

Figure 4:
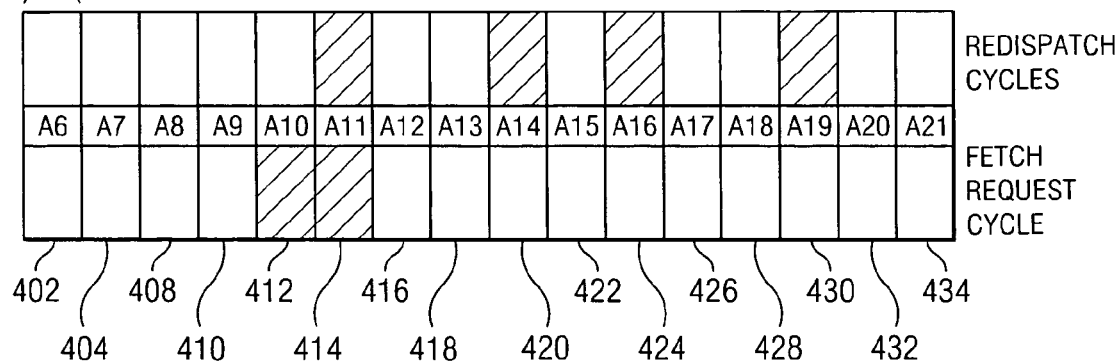
FIG. 4 is an exemplary diagram of a best-case return timing for a sector in a cache line shown in FIG. 3.

FIG. 4 is an exemplary diagram of a best-case return timing for a sector in a cache line as shown in FIG. 3 in accordance with a preferred embodiment of the present invention. In particular, FIG. 4 shows the best-case return timing for sector0 304. Core cycles A6-A18 402-424 are fetch request cycles. In this illustrative example for sector0 304, a fetch request is present on the interface between the processor core and the nest (e.g., L2 cache) in the A6 402 and A7 404 cycles. In A11 cycle 414, as a result of the best case return time on the demand load's critical sector, a restart_coming warning is present on the interface between the LSU and the dispatch unit. In the A10 412 and A11 414 cycles, a data_coming indicator is present on the interface between the nest and the core. Due to the data_coming indicator, a restart is present on the interface between the LSU and the dispatch unit in the A14 420 cycle. In response to the restart, a demand instruction is redispatched from the dispatch unit to the LSU in the A16 424 cycle. The demand instruction lookup is performed to coincide with the cycle data is first available in the LSU (e.g., A19 430) in the same cycle.

If the data_coming signal sent in the A10 412 and A11 414 cycles is false, this information is known in the A18 428 cycle of the original fetch. For example, in a fixed number of cycles after a data_coming is sent, the nest sends (or does not send) a dval (data valid) indication for that data coming. If the respective dval=1, it is a true data_coming; otherwise it is false. If the data_coming signal is false, another restart_coming will be sent immediately. The LSU then waits for another data_coming signal for the critical sector of the demand miss line fetch. This false data_coming scenario may happen repeatedly.

Figure 5:
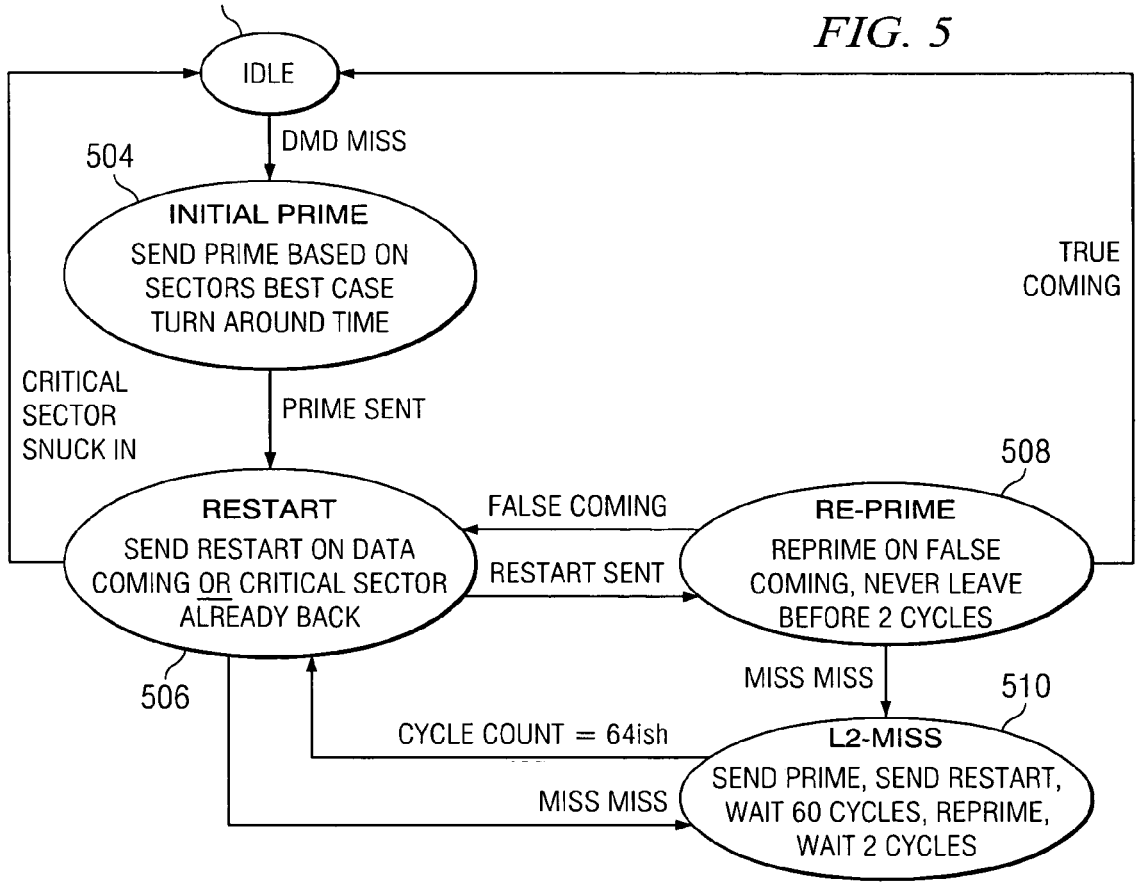
FIG. 5 is an exemplary diagram of a restart state machine in accordance with a preferred embodiment of the present invention.

Turning next to FIG. 5, an exemplary diagram of a restart state machine in accordance with a preferred embodiment of the present invention is shown. Each thread uses its own "restart state machine" to manage the interfaces described in FIG. 4 for L1 cache misses.

In particular, FIG. 5 illustrates a high level simplified state diagram (some states and events are not shown). Beginning with idle state 502, when the dispatch unit sends a load to the LSU, a demand miss (or a cache miss if not in lookahead mode) may occur for the thread. In initial prime state 504, the LSU then examines the cache line of the demand miss to determine the critical sector of the cache line. Based on the identified critical sector, the LSU determines the fastest time the L2 cache will be able to send the cache line back to the LSU, and also determines the amount of time the LSU may wait before sending the restart_coming signal to the dispatch unit. By waiting until the last possible moment to send the restart_coming signal, the core is able to continue to operate in lookahead execution mode before preparing for the restart.

In restart state 506, a restart signal is sent to the dispatch unit in response to the LSU detecting a data_coming signal on the interface between the nest and the core. Alternatively, a restart signal is sent to the dispatch unit if the LSU determines that the critical sector in the cache line has already been returned to the LSU. For example, when the state machine locks onto a data_coming signal, the state machine waits for a corresponding indication that the data_coming signal is valid. A data_coming signal may not be valid, for example, if there is a resource conflict and the L2 cache cannot provide the requested data. If it is determined that the data_coming, and corresponding restart, signal is not valid, the LSU must send another restart_coming for the same cache line to prepare the dispatch unit for the restart that will be sent once again when the critical sectors are sent to the core again. This second restart_coming is sent out while in re-prime state 508.

However, it is possible that a valid data_coming signal may be 'ignored' by the state machine. For example, the state machine locks onto a data_coming, and then waits to see if the corresponding dval indication is sent for that data_coming. Between the first data coming, and until the state machine decides if the data_coming is true or false, other data comings may be sent to the core (this means the first data_coming was false). The state machine will not pay attention to other data_comings once the state machine has locked onto one. In such as case, the thread's restart state machine will determine that the critical data "snuck in" without being detected in the data coming form, and will thus return to idle state 502. As a result, the fetch has completed, and the thread can be safely restarted. This situation is the result of optimizing the restart state machine for the "initial data coming is true" scenario, which occurs most often.

In addition, an L2 miss may occur (L2-miss state 510) if the requested data is not found in the L2 cache. Before the processor core determines that a line has missed in the L2 cache, the core makes an assumption that the line will hit. From fetch time, the initial restart_coming is sent to the dispatch unit based on the cache line, and then a restart is sent based on the data coming from the nest. If the line misses in the L2 cache, the data_coming signal turns out to be false. Responsive to the false data_coming detection, the state machine sends another restart_coming to prepare the dispatch unit for the later restart. After this point, the nest indicates that the fetch missed in the L2 cache. The restart_coming sent by the LSU stops the dispatch unit from sending instructions in lookahead mode. Since it may be a very long time before the demand critical data comes back to the dispatch unit, the restart state machine issues another restart. This restart is sent knowing that the resulting dispatch will miss the cache with the sole purpose of prompting the core to operate in lookahead execution once again (under the L2 miss wait time). A number of cycles (e.g., sixty cycles) are now allowed to pass before a restart_coming is sent to prepare the dispatch unit for the real data coming resulting from the data from beyond the L2 cache being sent into the core. If a re-prime is needed, the restart_coming signal is sent again, but with two cycles in between the restart and the restart_coming signal.

Figure 6:
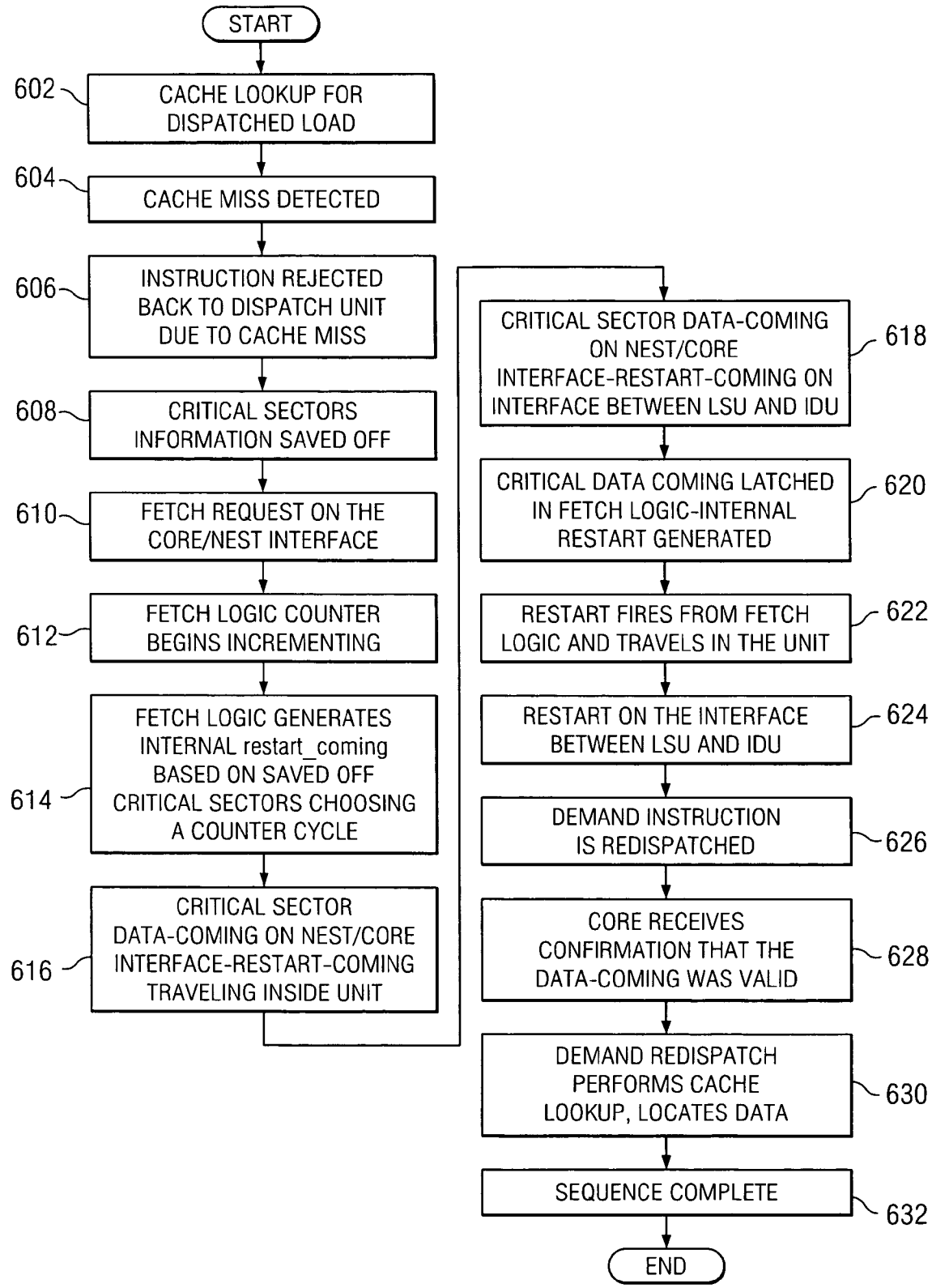
FIG. 6 is an exemplary diagram of a process for maintaining a best-case demand instruction redispatch in accordance with a preferred embodiment of the present invention.

FIG. 6 is an exemplary diagram of a process for maintaining a best-case demand instruction redispatch in accordance with a preferred embodiment of the present invention. Each cycle indication described in the process (and also shown in FIG. 4) refers to the original dispatched instruction that misses the cache and generates the fetch request. The process described in FIG. 6 may be implemented in a processor system, such as processor system 210 in FIG. 2.

In cycles A1 through A7 described below, the restart state machine is in an idle state, such as idle state 502 in FIG. 5. In the idle state, the process begins when a cache lookup is performed for the dispatched load in a first cycle, or A1 (step 602), and a cache miss is detected in A2 (step 604). As a result of the cache miss, the instruction is rejected back to the dispatch unit in A4 (step 606). In A5, the critical sector of the cache line is saved off (step 608). The load/store unit then issues a fetch request to the next level cache, wherein the fetch request is present on the core/nest interface in A6 and A7 (step 610).

In cycles A8 through A12 described below, the restart state machine is in an initial prime state, such as initial prime state 504 in FIG. 5. In the initial prime state, the fetch logic counter begins incrementing in cycle A8 (step 612). Based on the critical sector of the cache line saved off in step 608, the fetch logic generates an internal restart_coming choosing a counter cycle in A9 (step 614). In A10, a critical sector data_coming signal is present on the nest/core interface, and a restart_coming is traveling inside the load/store unit on its way to the dispatch unit (step 616). In A11, while the critical sector data_coming signal is present on the nest/core interface, the restart_coming is present on the interface between the load/store unit and dispatch unit (step 618). In the last cycle of the initial prime state, or A12, the critical sector data_coming signal is latched in the fetch logic and an internal restart is generated (step 620). It should be noted that in cycles A5 through A11, the processor core may be executing in lookahead mode.

In cycle A13, the restart state machine is in a restart state, such as restart state 506 in FIG. 5. In the restart state, the restart is fired from the fetch logic and travels in the unit (step 622).

In cycles A14 through A18 described below, the restart state machine is in a re-prime state, such as re-prime state 508 in FIG. 5. In A14, the restart is present on the interface between the load/store unit and the dispatch unit (step 624), and the demand instruction is redispatched in A16 (step 626). The processor core receives confirmation that the data_coming is valid in A18 (step 628).

In cycles A19 and A20, the restart state machine returns to idle state 502. When the demand redispatch performs a cache lookup for the data, the data is there just in time (step 630). In A20, the sequence is completed (step 632), and the process terminates thereafter.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for maintaining a best-case demand redispatch of an instruction, the method comprising:

responsive to a demand miss, sending a fetch request to a next level cache in a memory hierarchy;

examining a cache line of the demand miss to identify a critical sector of the cache line;

generating a best-case data return arrival time by determining a fastest time the next level cache is able to return the critical sector of the cache line; and sending a speculative warning to a dispatch unit to coincide with the best-case data return arrival time, wherein the speculative warning prepares the dispatch unit to resend the instruction for execution as data in the next level cache becomes available to a processor core.

2. The method of claim 1, wherein the speculative warning prepares the dispatch unit for a restart expected due to a data-coming signal from the next level cache.

3. The method of claim 2, further comprising;

responsive to an indication that the data-coming signal is not valid, sending another speculative warning to the dispatch unit.

4. The method of claim 3, wherein the data-coming signal is not valid due to a resource conflict and the next level cache cannot provide requested data.

5. The method of claim 2, further comprising:

prior to receiving an indication that the data-coming signal is not valid, receiving one or more subsequent data-coming signals.

6. The method of claim 1, wherein the critical sector is a subsection of the cache line containing data to be used by a demand load that fetched the cache line.

7. The method of claim 1, wherein the sending, examining, and generating steps are performed by a load/store unit.

8. The method of claim 1, wherein determining the fastest time the next level cache is able to return the cache line includes determining a longest allowable time delay upon which the speculative warning must be sent to the dispatch unit.

9. The method of claim 8, wherein sending the speculative warning after the longest allowable time delay maximizes a time the dispatch unit operates in lookahead execution mode.

* * * * *